Aug. 25, 1970 F. ULRICH 3,525,990

MAGNETIC TRANSLATOR

Filed July 2, 1965 3 Sheets-Sheet 1

INVENTOR
FRIEDRICH ULRICH

BY [signature]
ATTORNEY

Aug. 25, 1970 F. ULRICH 3,525,990

MAGNETIC TRANSLATOR

Filed July 2, 1965 3 Sheets-Sheet 2

FRIEDRICH ULRICH
INVENTOR

BY

ATTORNEY

INVENTOR
FRIEDRICH ULRICH

BY [signature]
ATTORNEY

United States Patent Office 3,525,990
Patented Aug. 25, 1970

3,525,990

MAGNETIC TRANSLATOR

Friedrich Ulrich, Stuttgart-Bad Cannstatt, Germany, assignor to International Standard Electric Corporation
Filed July 2, 1965, Ser No. 469,173
Int. Cl. H03k *13/247, 17/80*
U.S. Cl. 340—347 6 Claims

ABSTRACT OF THE DISCLOSURE

A magnetic core translator is provided as a translator for the sequence-operating circuit arrangement, in which one group of input-crosspoint-elements is connected with one group of output-crosspoint-elements through non-linear electric loops. By this means the crosspoint-elements also perform a storing function for the sequence-operating circuit arrangement.

This invention relates to a static electrical translator.

According to the present invention there is provided a static translation circuit which includes a pair of switching elements for each code to be translated, input leads via which, when a code to be translated is received, the first switching element for that code is selected to the exclusion of the first elements of other codes, a coupling from the first element to each pair of the second element thereof via which the second element of a pair can be enabled when the corresponding first element is selected, and output leads associated with said second elements such that the enablement of the second element of a pair causes a signal combination representing the translation for the received code to be provided on said output leads.

The use of two switching elements in the manner described above minimizes the limitations on the number of translations which are imposed by the characteristics of those elements. Such a translator is usable, for instance, in telephone exchanges for translating from dialled exchange codes to routing codes, and for effecting equipment number-directory number (and vice versa) translations. Translators also have useful applications in computers.

Figure 1:
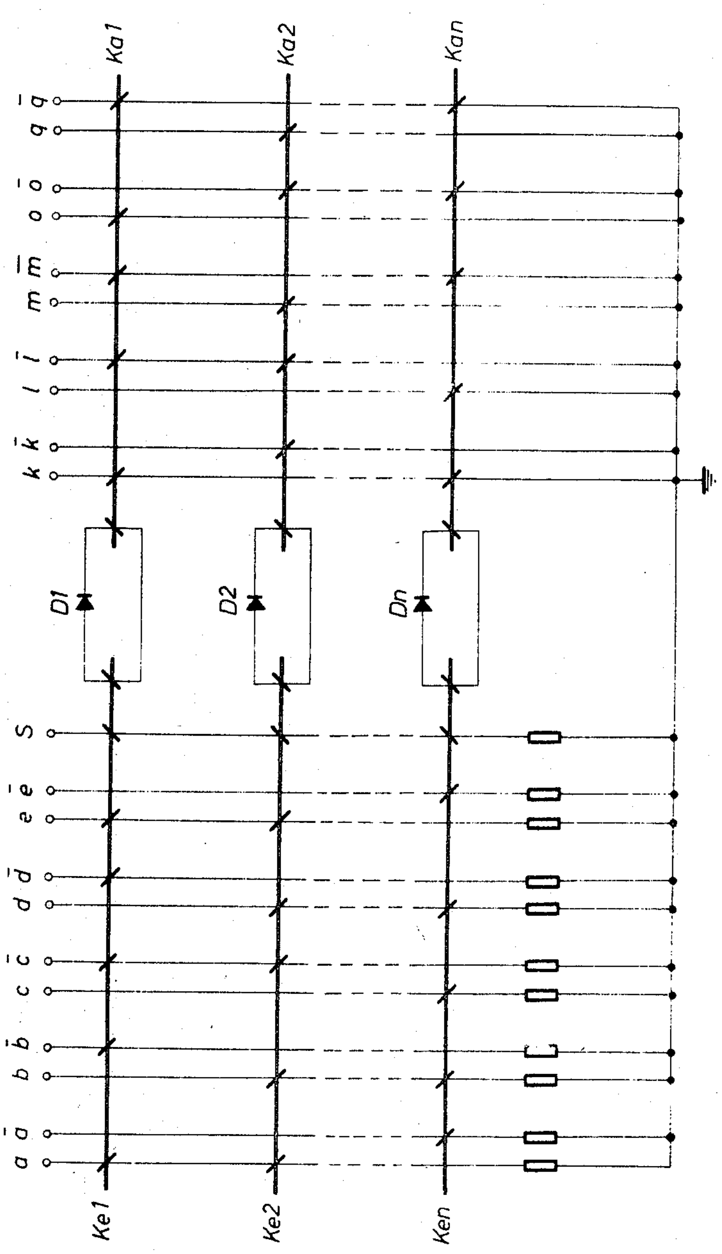
Figure 2:
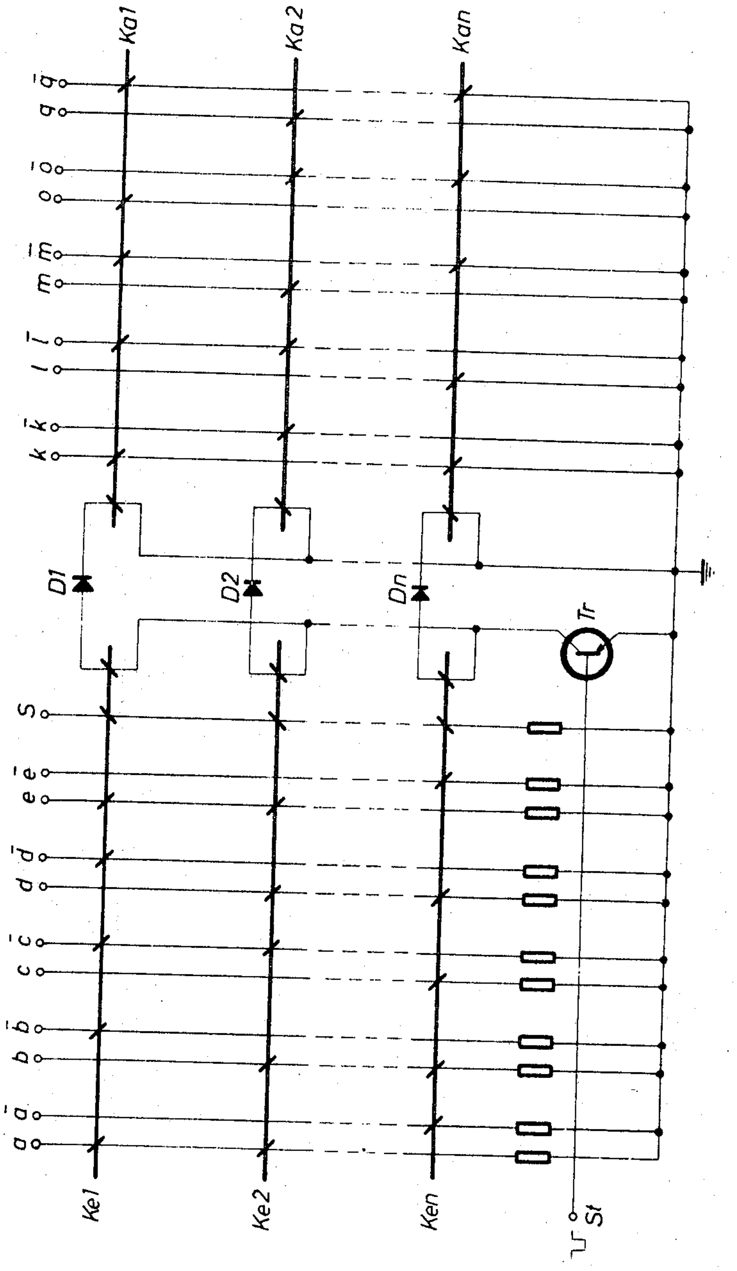
Figure 3:
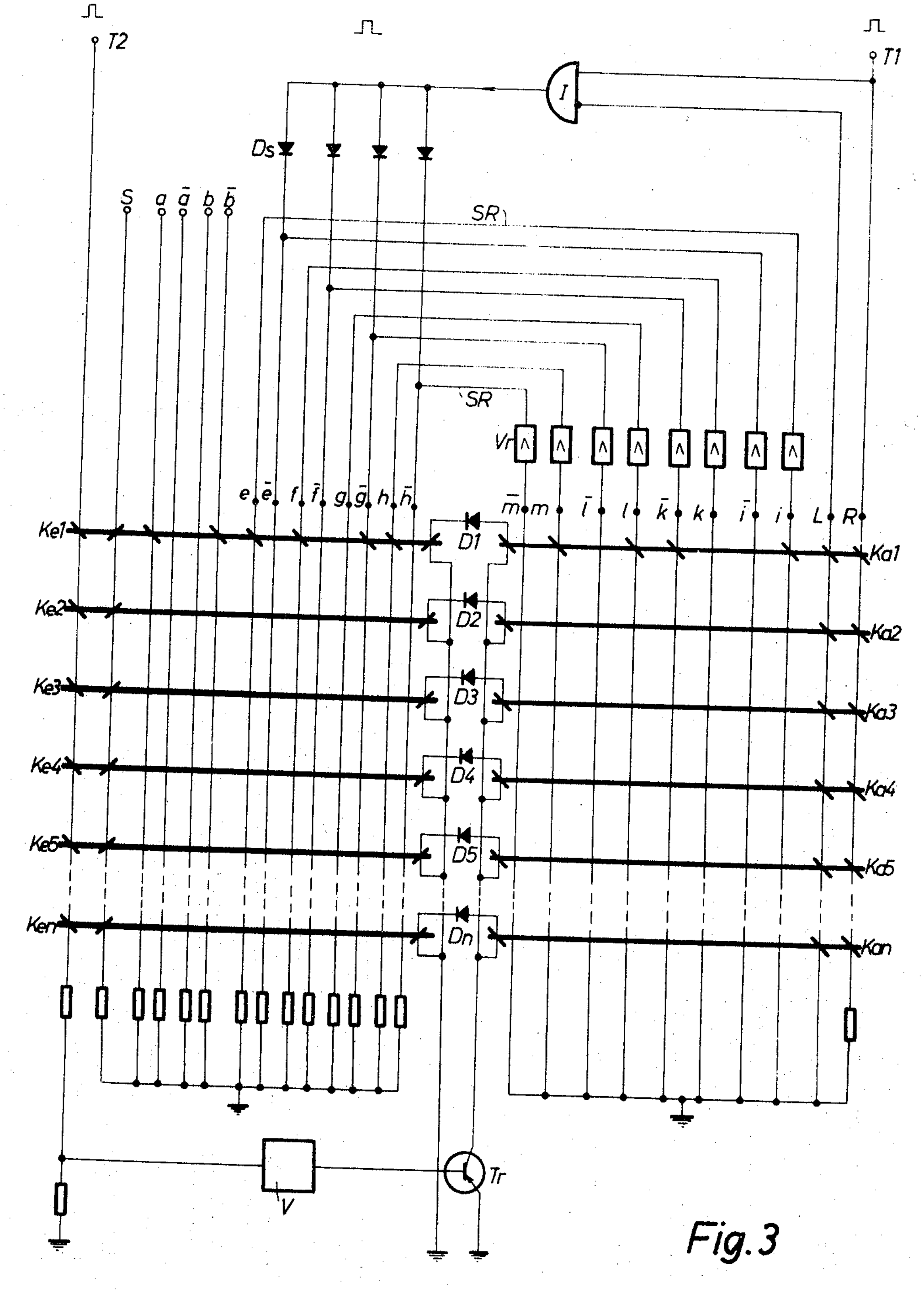

Embodiments of the invention will now be described in detail with reference to the accompanying drawings, wherein:

FIG. 1 is a translator according to the invention in which the switching elements are cores of magnetic material, FIG. 2 is a modification of the arrangement of FIG. 1, and FIG. 3 is a sequentially-operating translator derived from the arrangement of FIG. 2.

FIG. 1 shows a magnetic translator having a number of switching elements, each formed by a magnetic material core, the magnetic elements K*e*1, K*e*2 . . . K*en* and K*a*1, K*a*2 . . .K*an* being drawn as horizontal thick lines. The leads *a*, $\bar{a}$; *b*, $\bar{b}$ . . . *e*, $\bar{e}$; over which input code combinations to be dealt with are received, and the output leads; *k*, $\bar{k}$; *l*, $\bar{l}$ . . . *q*, $\bar{q}$ over which translations are obtained are drawn as thin vertical lines. A set-reset lead S is shown threading all the magnetic elements *ke*1 through *ken*. When an input or an output lead passes through a switching element an oblique line is drawn at the intersection of its line at the line for that element. A pair of magnetic elements is associated with each of the codes for which translations may be needed, and the two cores of a pair are coupled via a non-linear elecctrical group. Thus the element K*e*1 of the input-loop is coupled to the element K*a*1 of the output-group through a connecting loop including a diode D1. The input-group element K*e*2 is coupled to the output-group element K*a*2 via a diode D2 and so forth.

The operation of the translator will now be described. When a code combination to be translated is received parallel-fashion over the input leads, of which true and complement wires (e.g. *a* and $\bar{a}$) are provided for each bit place, current is also applied via wire S to all elements K*e*1, K*e*2 . . . K*en* of the input group. The control leads *a*, $\bar{a}$; *b*, $\bar{b}$ . . . *e*, $\bar{e}$ are threaded through the elements such that all non-selected elements receive current at least through one control lead, which current influences them in the reverse direction. Therefore they are not reversed in their magnetism when a code is received, or are only so charged that the produced signal is not transmitted through the electric loop. Only the element selected is operated and has its magnetism reversed. That is, the input code inhibits all cores except the one for the code to be dealt with, so that the current applied via the wire S—threaded in opposition to the control wires—can alter the condition of the core for the received code. For example, element K*e*1 is actuated when the input code $\bar{a}$, *b*, *c*, *d*, $\bar{e}$, (01110) is applied, element K*e*2 for code $\bar{a}$, $\bar{b}$, *c*, $\bar{d}$, $\bar{e}$, and elements K*en* for *a*, $\bar{b}$, $\bar{c}$, $\bar{d}$, *e*. During the process of changing a core's condition in this way, a signal is introduced in the electric loop threading that core, which signal passes through the diode and, hence, influences the corresponding element of the output-group. The output-control leads *k*, $\bar{k}$; *e*, $\bar{e}$ . . . *q*, $\bar{q}$ are threaded in accordance with the code desired. If, for example, the crosspoint-element K*e*1 of the input-group is changed, signal pulses occur on the output-control leads *k*, $\bar{l}$, $\bar{m}$, *o*, $\bar{q}$ (10010) when the associated element K*a*1 of the output-group is actuated. The polarity of these pulses can be determined by the sense of winding of the wires. When the element K*a*2 is actuated the output-control leads $\bar{k}$, $\bar{l}$, *m*, $\bar{o}$, *q* furnish signal-pulses and, when the element K*an* is actuated signal pulses occur on the output-control leads *k*, *l*, $\bar{m}$, $\bar{o}$, $\bar{q}$.

Such a magnetic translator has the advantage that it is easy to modify the translation arrangements, because only the non-linear electric coupling loop must be connected with the respective element of the output-group for the new translation desired.

If the magnetic switching-elements have a rectangular hysteresis-loop the output-information (i.e. the translation can be obtained either when the selected element of the output-group is set via the coupling loop, or when the element is reset to rest. With square loop cores for the elements K*e*1–K*en*, positive restoration is needed, e.g. by a reverse pulse in wire S. Another point is that the existence of two groups of switching elements enables them to be used for a storing process. A first input code is "led" to the corresponding output group element via the electrical loops as described above, after which a second input-code can be stored temporarily in the crosspoint-element of the input-group. For this it is necessary to make the connections accomplished by the diodes between the two mutually connected sets of magnetic-elements controllable.

FIG. 2 shows a translator similar to that of FIG. 1, but in which the electric loops which couple the cores of the two sets are completed via a common switch. This switch can be, for example, a transistor T*r*, which is normally non-conductive and which is made conductive when required via the control-input S*t*. When a code combination is to be transferred from an element of the input-group to the corresponding element of the output-group, the control-input S*t* is actuated so that the transistor T*r* becomes conductive, thereby closing the coupling loops. This enables the applied input-code to be stored in the input-group alone, or to be transferred to the output-group. In the latter case it would normally be necessary to reset the output group cores to rest before transfer, e.g. via a common wire (as in FIG. 1). This is particularly useful when arranging circuits to operate in a defined sequence. Such a translator also permits different signals arriving in timed sequence to be stored, and to be released later only during an individual interrogative scanning.

It should be mentioned that the elements of both groups can have different magnetic properties; depending on the technical requirement. Thus the elements of one group can show a linear characteristic and elements of the other group a rectangular characteristic.

In the arrangement of FIG. 3, which is derived from that of FIG. 2, the output wires $i$, $\bar{i}$ to $m$, $\bar{m}$ are coupled via amplifiers V*r* and coupling wires SR to the input side so that a feedback operation occurs which is useful for sequential operation.

When an input code to be dealt with is received, the wires $a$, $\bar{a}$, $b$, $\bar{b}$ cause a switching-element (a magnetic core, as in FIGS. 1 and 2) K*e*1 to K*en* of the input-group to be selected, i.e. reversed. The output-signal due to the reversal of this element of the input-group passes through the non-linear electric crosspoint loop including one of the diodes D1 to D*n*, thereby setting the associated element K*a*1 to K*an* of the output-group. The setting of an output core can give an effective output if desired, or the output can only be effective on resetting the cores to rest.

Such a magnetic translator can now be used as a sequence-operating circuit arrangement as follows. Assuming that an element K*a*1 to K*an* of the output-group is set, current is applied to the restoring loop R of the output group cores at the same time as new information is applied to the wires of S, $a$, $\bar{a}$, $b$, $\bar{b}$ threading the input group cores, this occuring at a time T1, by a timing pulse T1. The set output-element is reset by this current, so that an appropriate output-signal combination occurs on the output-lines $i$, $\bar{i}$ . . . $m$, $\bar{m}$. These output-signals are regeneratively fed back through amplifiers V*r* and feed-back paths SR to the input control leads $e$, $\bar{e}$ . . . $h$, $\bar{h}$ so that this read-out output-information now forms part of the new total information to be handled. Consequently, one of the input elements defined by the two portions of input applied to leads $a$–$\bar{b}$ and $e$–$\bar{h}$ is set. Since each application input-information causes the setting loop S to be pulsed, the translation can be made in the simplest manner in that the selected element is set. The selected element is, as usual, the only one which receives blocking current via any one of the input-control-leads $a$, $\bar{a}$, $b$, $\bar{b}$, $e$, $\bar{e}$, to $h$, $\bar{h}$, and hence only this element is set. Since the non-linear electric loops with the semiconductor diodes D1 to D*n* are interrupted through the transistor-switching-stage T*r*, this setting process has no effect on the output-end. A following timing pulse T2 resets the selected crosspoint-element K*e*1 to K*en* and also makes the transistor T*r* conductive. The enablement of T*r* is delayed by a delay V so that the short interfering pulses of the not-selected elements cannot reach the output-group. The longer output-pulse produced when the selected element resets can reach the corresponding element of the output group via the associated coupling loop whereby that element is set.

After the timing-pulse T2 new information is stored on the output-side of the translator so that, when new input-information arrives, another translation can be made. The mode of action of the sequence-operating circuit arrangement is determined by the translation selected between the output control-leads $i$, $\bar{i}$ to $m$, $\bar{m}$ and the input-control-leads $e$, $\bar{e}$ to $h$, $\bar{h}$. Hence it is not effectual that at each new translation a new code information is fed in through the input-control-leads S, $a$, $\bar{a}$, $b$, $\bar{b}$. In in a cyclically and periodically operating circuit arrangement a simple impulse is sufficient. Assuming that in the output-condition no element of the output-group is set, no signal occurs on the readout-loop L during the timing pulse T1. The control-timing-pulse T1 can therefore furnish the starting-information via the gate-circuit I and the decoupling diodes D*s* onto the feed-back paths SR, leading to the complementary inputs $\bar{e}$, $\bar{f}$, $\bar{g}$, $\bar{h}$ so that through the following translations, without feeding in extra information, a stored programme is automatically run through. This is suitable for a pre-stored sub-routine, such as used in digital computers for a frequently used sequence of orders. In such a case the input leads $a$, $\bar{a}$, $b$, $\bar{b}$ (which could be greater in number if needed) could be used to supply extra data to allow of conditioned instructions being included in the sequence.

To provide an output for the translations, either other output connections from the cores shown, e.g. on the output side of the amplitude V*r* can be used, or an extra set of output cores could be provided.

While the principles of the invention have been described above in connection with specific apparatus and applications, it is to be understood that this description is made only by way of example and not as a limitation on the scope of the invention.

I claim:

1. A static magnetic translation circuit comprising a plurality of pairs of magnetic switching elements providing a pair of magnetic switching elements for each code to be translated, each of said pairs of magnetic switching elements including only one input element and only one output element for each code to be translated, all of said input magnetic switching elements arranged in a first group, all of said output magnetic switching elements arranged in a second group, input control leads threading the elements of said first group so that a received code to be translated causes a change in the magnetic state of the input one of that codes magnetic switching elements in said first group, output control leads threading the magnetic switching elements of said second group so that when the magnetic state of the codes output magnetic switching element is changed a signal combination representing the corresponding translation occurs on the said output control leads, means for interconnecting the input and output magnetic switching elements of each of said pairs, said interconnecting means comprising a non-linear electrical loop, whereby when a received code causes a change in the magnetic state of the input element the magnetic state of the corresponding output element is changed via the non-linear electrical loop.

2. A circuit according to claim 1 and in which said non-linear electrical loops each include a semi-conductor diode.

3. A circuit according to claim 1, and in which said non-linear electrical loops each include a common switch which is only closed when one of said output elements is to be set from its input element; whereby said first group acts as a memory means until said common switch is closed.

4. A circuit according to claim 3 wherein a set lead is provided threading each of said input magnetic switching elements of said first group, means including said input control leads for enabling the input magnetic switching element for the received code to respond exclusively to writing current applied to all the input magnetic switching elements through said set lead, whereby said element which has the received code are magnetically reversed by writing current applied through said set lead, and means responsive to the reversal of the said element for the received code for causing a first signal to pass through the non-linear loop coupling that element to the corresponding output element, and means responsive to said first signal for causing the reversal of the corresponding second element thereby furnishing the translated output signals.

5. A circuit according to claim 1 and, in which at least some of said magnetic switching elements with rectangular hysteresis-loops are used.

6. A static magnetic translation circuit comprising a plurality of pairs of magnetic switching elements with a single pair of said plurality of pairs of magnetic switching elements for each code to be translated, each pair of magnetic switching elements including an input element and an output element, all of said input magnetic switching elements arranged in a first group, all of said output magnetic switching elements arranged in a second group, input control leads threading the elements of said first group so that a received code to be translated causes a change in the magnetic state of the input one of that codes magnetic switching elements in said first group, output control leads threading the magnetic switching elements of said second group so that when the magnetic state of the codes output magnetic switching elements is changed a signal combination representing the corresponding translation occurs on the said output control leads, means for interconnecting the input and output magnetic switching elements of each of said pairs, said interconnecting means comprising a non-linear electrical loop, whereby when a received code causes a change in the magnetic state of the input element the magnetic state of the corresponding output element is changed via the non-linear electrical loop, said non-linear electrical loops each including a common switch which is closed only when one of said output elements is to be set from its input element, whereby said first group acts as a memory means until said common switch is closed, a set lead threading each of said input magnetic switching elements of said first group, means including said input control leads for enabling the input magnetic switching element for the received code to respond exclusively to writing current applied to all of the input magnetic switching elements through said set lead, whereby said element which has the received code is magnetically reversed by writing current applied through said set lead, means responsive to the reversal of said element for the received code for causing a first signal to pass through the non-linear loop coupling the element to the corresponding output element, means responsive to said first signal for causing the reversal of the corresponding output element thereby furnishing the translated output signal, a reset lead threading each of the output elements in the second group, means for feeding back the output signals to a group of input leads threading at least one of said input magnetic switching elements in said first group, means for simultaneously feeding set and input signals into said input elements thereby changing the magnetic state of one of the elements of the input group, means responsive to the change of state of said one of said input elements for changing the magnetic state of the corresponding output magnetic element in said output group of magnetic elements, and delaying means for delaying the operations of said switching means to assure that noise pulses do not cause setting of said input elements, whereby said translator performs as a sequence operating translator.

References Cited

UNITED STATES PATENTS

| | | | |
|---|---|---|---|
| 2,733,861 | 2/1956 | Rajchman | 235—61 |
| 3,011,165 | 11/1961 | Angel et al. | 340—347 |
| 3,246,315 | 4/1966 | Gear | 340—347 |
| 3,268,819 | 8/1966 | Eachus | 328—42 XR |
| 3,067,414 | 12/1962 | Kelly | 340—347 |

THOMAS A. ROBINSON, Primary Examiner

M. K. WOLENSKY, Assistant Examiner

U.S. Cl. X.R.

340—147, 174